United States Patent [19]
Crooks

[11] 3,722,301
[45] Mar. 27, 1973

[54] POWER SHIFT PLANETARY AND COUNTERSHAFT TRANSMISSION

[75] Inventor: James W. Crooks, Milwaukee, Wis.

[73] Assignee: Allis-Chalmers Corporation, Milwaukee, Wis.

[22] Filed: Oct. 22, 1971

[21] Appl. No.: 191,719

[52] U.S. Cl. ............... 74/15.63, 74/682, 74/705, 74/674
[51] Int. Cl. ................... F16h 37/00, F16h 37/06
[58] Field of Search ...... 74/681, 682, 705, 674, 15.63

[56] References Cited

UNITED STATES PATENTS

| | | |
|---|---|---|
| 2,511,039 | 6/1950 | Black et al. ................. 74/720 |
| 2,793,533 | 5/1957 | Swenson et al. ............. 74/15.63 |
| 2,827,805 | 3/1958 | Miller ......................... 74/682 X |
| 2,932,202 | 4/1960 | Rinkema .................... 74/15.63 X |
| 3,065,643 | 11/1962 | Mark et al. ................. 74/15.63 |
| 3,430,518 | 3/1969 | Auriol ........................ 74/705 |
| 3,487,723 | 1/1970 | Piot ............................ 74/682 |
| 3,487,724 | 1/1970 | McIntyre et al. ........... 74/15.6 X |

Primary Examiner—Arthur T. McKeon
Attorney—Arthur L. Nelson

[57] ABSTRACT

A power shift transmission having planetary and countershaft gearing with clutch carriers for selectively transmitting power through the front planetary gearset or countershaft gearset with rear clutch carriers for transmitting through the rear planetary gearset to the output shaft.

10 Claims, 5 Drawing Figures

| RANGE | CLUTCHES | TORQUE RATIO |
|---|---|---|
| R | 20-40-70 | -1.94 |
| 1 | 20-50-100 | 4.66 |
| 2 | 20-100-70 | 2.76 |
| 3 | 50-70-100 | 2.06 |
| 4 | 40-70-100 | 1.83 |
| 5 | 30-70-100 | 1.59 |
| 6 | 30-50-100 | 1.27 |
| 7 | 30-50-70 | 1.00 |

POWER SHIFT PLANETARY AND COUNTERSHAFT TRANSMISSION

This invention relates to a vehicle transmission and more particularly to a vehicle transmission having front and rear planetary gearsets and a countershaft gearset with clutch carriers for selectively transmitting power through the front or countershaft gearset and through the rear planetary gearset to the output shaft.

Vehicle power transmissions for tractors employ various means for transmitting power through the transmission. Planetary gear transmissions and countershaft transmissions have been used extensively with either mechanical or power shift means for selecting the power paths and speed ratios through the transmission. The power shift transmission employs a plurality of hydraulically actuated clutches or brakes which selectively engage the brake or one or more clutches for transmitting power through the transmission at the desired speed ratio. This type of a transmission must provide the proper sequence of increasing speed ratios with means for selectively providing smooth transition of power for each succeeding speed ratio of the transmission.

Accordingly, this invention provides a combination of a planetary and countershaft transmission with a plurality of brake and clutches to selectively provide this smooth transition of power. For each shift of gears only one transmission shift is needed in the forward range for a seven speed forward transmission. Single transition shifts assure the smooth transition of power for each successive speed ratio of the transmission to maintain continuous power for either upshift or downshift of the transmission while the vehicle is carrying the continuous draft load.

It is an object of this invention to provide a power shift transmission having a front and a rear planetary gearset and a countershaft gearset with clutching means for selectively transmitting power through the transmission.

It is another object of this invention to provide a planetary transmission having countershaft gearset with a front clutch carrier for selectively transmitting power from the input drive shaft to the planetary gearset or the countershaft gearset and a plurality of rear clutch carriers for selectively transmitting power from the planetary gearsets and countershaft gearset to the output shaft.

It is a further object of this invention to provide a planetary transmission having countershaft gearing with a front clutch carrier for selectively transmitting power from the input shaft to the front planetary gearset and countershaft gearset and a plurality of rear clutch carriers to selectively transmit the power from the planetary gearsets or the countershaft gearsets to the output shaft at various selective speed ratios.

The objects of this invention are accomplished by providing a front planetary gearset and a rear planetary gearset. The input drive shaft is connected to the sun gear of the front planetary gearset while the output shaft is connected to the planetary carrier of the rear planetary gearset. A front clutch carrier and two rear clutch carriers rotate coaxially with the planetary gearsets. The front clutch carrier and the second of the rear clutch carriers each carry a gear adapted for engaging a countershaft gearset. The clutches on the front clutch carrier accordingly selectively drive through one or both of the planetary gearsets and/or the countershaft gearsets while the rear clutch carriers selectively engage the countershaft gearset and one or both of the planetary gearsets to the output drive shaft. A brake is also provided to brake the front clutch carrier to the transmission housing. Hydraulic actuating means is provided in the transmission to selectively engage one or more of the brakes or clutches to provide the desired speed ratio for speed transmission.

The preferred embodiments of this invention are illustrated in the attached drawings.

Figure 1:
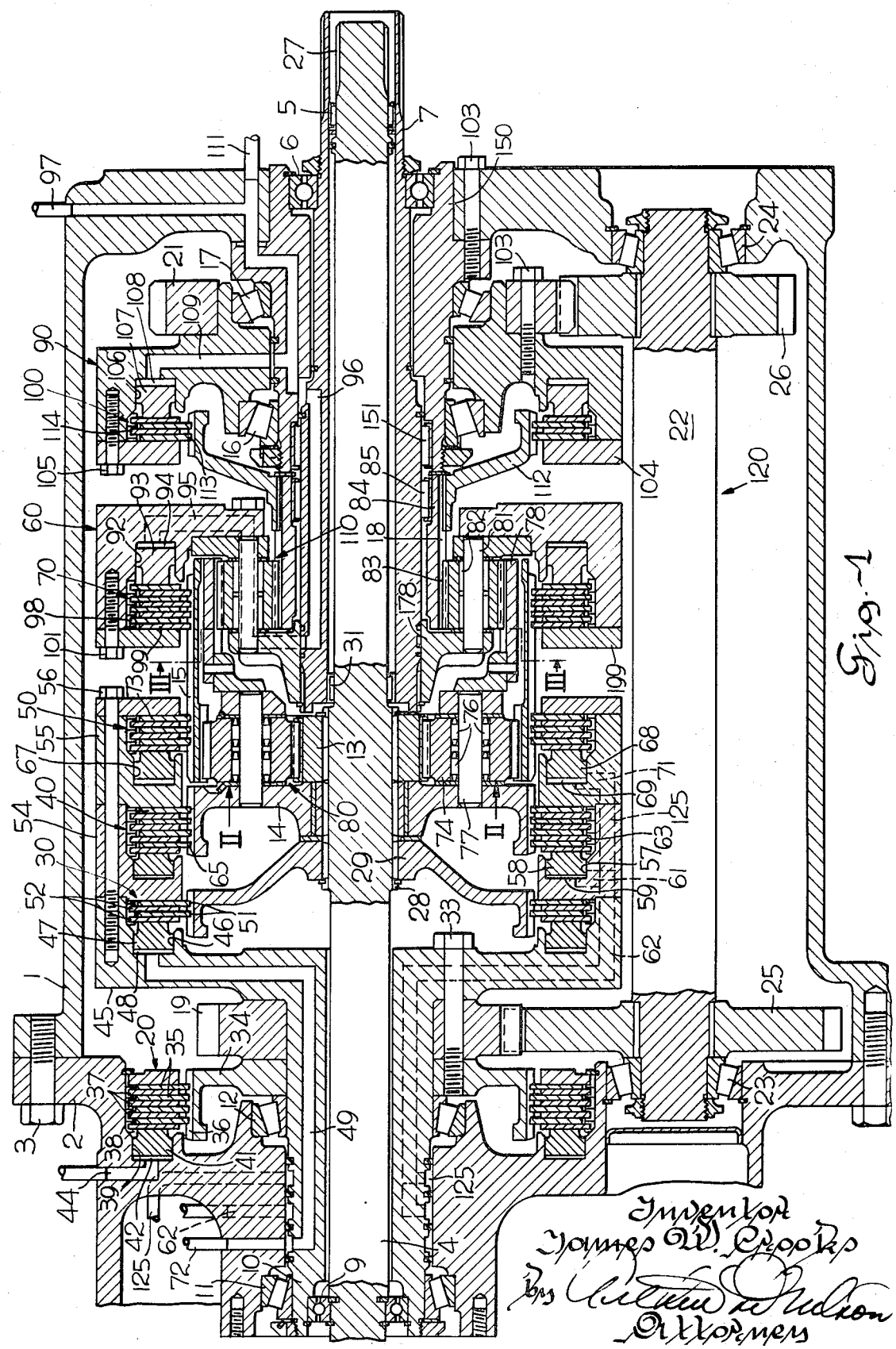
FIG. 1 illustrates a cross section view of the transmission.
Figure 2:
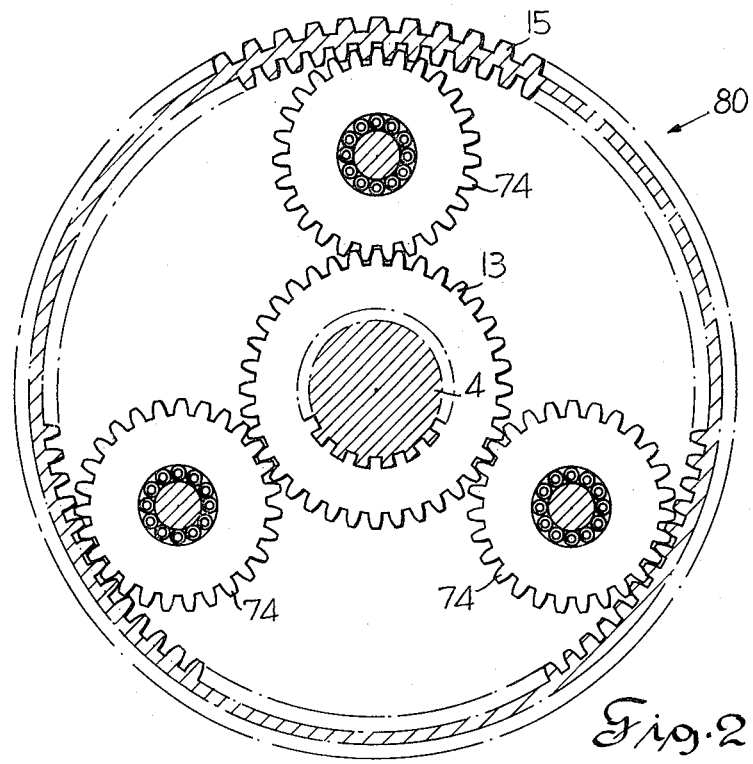
FIG. 2 illustrates a cross section view taken on line II—II of FIG. 1.
Figure 3:
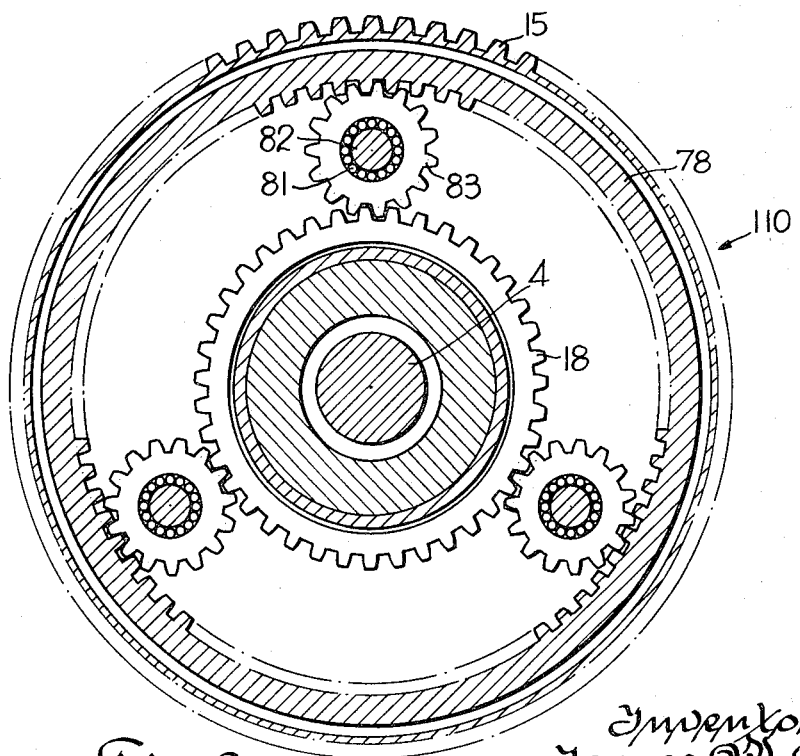
FIG. 3 illustrates a cross section view taken on line III—III of FIG. 1.

Referring to the drawings, FIG. 1 illustrates a cross section view taken on a line through the center of the transmission. The transmission housing 1 is bolted to the end plate 2 by means of a plurality of bolts 3. The input shaft 4 extends coaxially through the transmission housing 1 and is rotatably supported in the bearing assembly 5. The bearing assembly 5 is embraced by the quill shaft 7 which operates as the output shaft. The output shaft 7 is rotatably mounted in the bearing assembly 6 within the sleeve 150 in the transmission housing 1.

The opposite end of the input shaft 4 is rotatably mounted in the bearing assembly 9 which is embraced by the front clutch carrier 10. The front clutch carrier 10 is rotatably supported by the bearings 11 retained within the end plate 2 and also supported on the bearing assembly 12 on the internal side of the end plate 2. The end plate 2 also supports the brake 20 for braking the front clutch carrier 10.

The front clutch carrier 10 carries the clutches 30, 40 and 50 for braking the sun gear 13, the planetary carrier 14, or ring gear 15, respectively.

The first of the rear clutch carriers 60 is supported on the output shaft 7 and carries the clutch 70 for selectively clutching the output shaft 7 to the ring gear 15 of the front planetary gearset 80.

The second of the rear clutch carriers 90 is rotatably mounted on the bearing assemblies 16 and 17 on the transmission housing 1 and carries the clutch 100 for selectively clutching the second rear clutch carrier 90 to the sun gear 18 of the second planetary gearset 110.

The front clutch carrier 10 carries the drive gear 19 and the second of the rear clutch carriers 90 carries a driven gear 21. The countershaft 22 is rotatably mounted on the bearing assembly 23 mounted on the end plate 2 and the bearing assembly 24 mounted in the transmission housing 1. The countershaft 22 carries the gears 25 and 26 for meshing with the gears 19 and 21, respectively, to operate as a countershaft gearset 120.

The input drive shaft 4 is formed with the power take-off spline 27 and provides a continuously operating power take-off shaft while the transmission is in operation.

The input shaft 4 also carries a spline 28 to receive a clutch hub 29 and the sun gear 13. The input drive shaft 4 is also embraced by the bearing assembly 31 which nestles in the inner end of the output driven shaft 7. Accordingly, the front clutch carrier 10 rotates coaxially with the input drive shaft 4.

The front clutch carrier 10 carries the drive gear 19 which is bolted to the clutch carrier 10 by a plurality of bolts 33. The bolts 33 threadedly engage the brake hub 34 which carries the rotating brake disks 35 on the spline 36. The stationary brake disks 37 are carried on a spline 38 internally of the end plate 2. The end plate 2 also forms the brake cylinder 39 which receives the brake piston 41 defining the pressurizing chamber 42. The pressurizing chamber 42 is in communication with the passage 44 for receiving pressurized fluid for actuation of the brake. The brake operates to brake the front clutch carrier 10 when the brake is actuated.

The front clutch carrier 10 includes the bell housing 45 which forms the hydraulic cylinder 46 receiving the clutch piston 47 to define the pressurizing chamber 48. The pressurizing chamber 48 is in communication with the passage 49 of the hydraulic system. The clutch disks 51 are received on a splined portion of the clutch hub 29 while the clutch disks 52 are received on the inner periphery of the bell housing 45. When the clutch 30 is actuated, the sun gear 13 which is splined to the input drive shaft 4 is clutched to the front clutch carrier 10.

The clutches 40 and 50 are also carried on the front clutch carrier 10. The annulus 54 and the annulus 55 are bolted to the bell housing 45 by means of a plurality of bolts 56. The annulus 54 forms a hydraulic cylinder 57 receiving the piston 58 defining a pressurizing chamber 59. The pressurizing chamber 59 is connected by passage 61 to passage 62 in the hydraulic system. The brake disks 63 are carried on the spline of the inner periphery of the annulus 54 while the clutch disks 65 are carried on the splined portion of the planetary carrier 14. Actuation of clutch 40 clutches the front clutch carrier 10 to the planetary carrier 14.

The annulus 55 forms a hydraulic clutch cylinder 67 which receives the clutch piston 68 forming the pressurizing chamber 69. The pressurizing chamber 69 is in communication with passage 71 which in turn is connected to the passage 125 of the hydraulic system. The clutch disks 73 are carried on the external periphery of the ring gear 15 while the clutch disks 174 are carried on the spline of the internal periphery of the annulus 55. When the clutch 50 is actuated, the ring gear 15 is clutched to the front clutch carrier 10.

A front planetary gearset 80 consists of the sun gear 13 and a plurality of planet gears 74 carried on the planet carrier 14. The planet gears 74 are each carried on the needle bearing assemblies 76 embracing pin 77.

The planetary carrier 14 is also connected to the ring gear 78 of the second planetary gearset 110. The second planetary gearset 110 also includes a plurality of planet gears 83 each mounted on a pin 81 carrying a plurality of needle bearings 82 on the planetary carrier 178. The sun gear 18 and the ring gear 78 each mesh with a plurality of planetary gears 83. The sun gear 18 is integral with the sleeve 84 which is mounted on the bearing assembly 85 which embraces the output shaft 7.

The second rear clutch carrier 90 is also rotatably mounted on bearing assemblies 16 and 17 which embraces the support sleeve 150. Support sleeve 150 encircles bearing 151 which also rotatably supports the output shaft 7.

The first rear clutch carrier 60 forms a hydraulic cylinder 92 receiving the hydraulic piston 93 forming the pressurizing chamber 94 which is in communication with the passages 95, 96 and 97 of the hydraulic system. The clutch disks 98 on the carrier 60 engage the clutch disks 99 on the ring gear 15. The reaction plate 199 is bolted by a plurality of bolts 101 to form a part of the clutch carrier 60. The reaction plate 199 provides the reaction force for engaging clutch disks 98 and 99 when the clutch 70 is actuated for clutching the first rear clutch carrier 60 to the ring gear 15 of the front planetary gearset 80.

The second rear clutch carrier 90 which is rotatably mounted on the bearing assemblies 16 and 17 carries a driven gear 21 which is bolted to the clutch carrier by means of a plurality of bolts 103. The reaction plate 104 is bolted by means of the bolts 105 to form a part of the clutch carrier 90. A clutch carrier 90 forms a hydraulic cylinder 106 receiving hydraulic piston 107 forming pressurizing chamber 108 in communication with the passages 109 and 111 in the hydraulic system. A clutch hub 112 is splined to a sun gear 18 of the rear planetary gearset 110. The clutch hub 112 carries the clutch disks 113 while the second rear clutch carrier 90 carries the disks 114. When the clutch 100 is actuated, the second rear clutch carrier 90 is clutched to the sun gear 18.

The countershaft gearset consists essentially of a drive gear 19 carried on the front clutch carrier 10 which engages the gear 25 on the countershaft 22. The gear 26 on countershaft 22 engages the driven gear 21 on the second rear clutch carrier 90. The front clutch carrier is selectively clutched through the clutches 30, 40 and 50 for transmitting power through the countershaft 22. The countershaft 22 is also selectively clutched to the second rear planetary clutch carrier 90 through the clutch 100 to the sun gear of the rear planetary gearset 110.

Figures 4, 5:
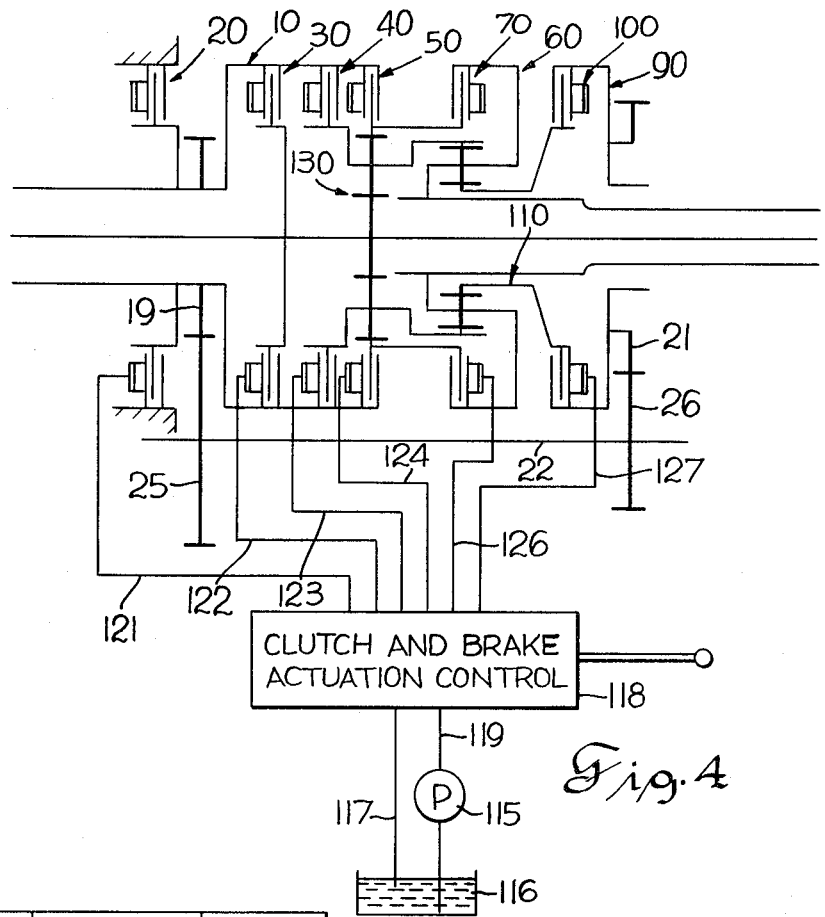
FIG. 4 is a schematic illustration of the transmission and hydraulic actuating means.
FIG. 5 illustrates the speed ratio and range of the transmission and the clutches engaged for providing the speed ratio as indicated.

Referring to FIG. 4, a schematic illustration of the transmission is shown with hydraulic means for actuating the transmission. The hydraulic system includes a pump 115 receiving fluid from the reservoir 116. Pressurized fluid from the pump 115 is supplied through conduit 119 to the clutch and brake actuation control valve 118. A return conduit 117 is connected to the brake and clutch actuation control valve 118. The control valve 118 selectively supplies pressurized fluid to the brake 20 and the clutches 30, 40, 50, 70 and 100. The brake and clutches are actuated as indicated in FIG. 5 to provide the speed ratios for the transmission as shown in the table. The conduit 121 is connected to passage 44 for the brake 20. The conduit 122 is connected to the passage 72 to actuate the clutch 30. The conduit 123 is connected to the passage 61 and 62 to actuate the clutch 40. Conduit 124 is connected through passages 71 and 125 to actuate the clutch 50. Conduit 126 is connected through passages 95 and 97 to actuate clutch 70. Passages 109 and 111 are connected through conduit 127 to actuate the clutch 100.

The operation of the transmission will be described in the following paragraphs.

When the transmission is placed in reverse drive, brake 20 and clutches 40 and 70 are actuated. The brake 20 brakes the front clutch carrier 10 and the clutch 40 as the front clutch carrier 10 clutches the planetary carrier 14 to the front clutch carrier 10. This holds the planetary carrier 14 in a stationary position while the input driving torque on the input shaft 4 drives the sun gear 13 to counter-rotate the ring gear 15. The reverse rotation of the ring gear 15 drives the first clutch carrier 60 of the rear clutch carriers since the clutch 70 is engaged. The power is transmitted through the first of the rear clutch carriers 60 through the planetary carrier 178. The planetary carrier 178 is connected to the output shaft 7 thereby providing a reverse drive for the transmission.

When the transmission is placed in the first forward speed, the brake 20 and clutches 50 and 100 are engaged. When the brake 20 is engaged, the front clutch carrier 10 is locked to the transmission housing 1. The clutch 50 is also engaged thereby clutching the ring gear 15 to the front clutch carrier 10 and locking the ring gear 15 to the housing through the brake 20. The driving torque on the input shaft 4 and sun gear 13 is transmitted to the carrier 14 on the front planetary gearset 80. Locking the front clutch carrier 10 also locks the second of the rear clutch carriers 90 through the countershaft gearset. Since clutch 100 is also engaged, this locks the sun gear 18 of the second planetary gearset 110. With the sun gear of the second planetary gearset locked, the driving torque on the ring gear 78 is transmitted to the planet gears 83. Consequently, the planetary carrier 178 rotates in the direction of the ring gear 78 to drive the output shaft 7 thereby providing high torque on the output shaft 7 in forward direction.

When the transmission is placed in the second speed forward, brake 20 and clutches 70 and 100 are engaged. When brake 20 is engaged, the front planetary clutch carrier 10 is braked to the housing 1. The clutch 70 is also engaged thereby clutching the ring gear 15 with the first of the rear clutch carriers 60. The input torque on the input drive shaft 4 is transmitted through the sun gear 13 to the planet gears 74 which drives the planetary carrier 14. The sun gear 18 of the second planetary gearset 110 is locked through the countershaft gearset since the brake 20 locks the front clutch carrier 10. The carrier 14 of the front planetary gearset 80 is connected to the ring gear 78 of the rear planetary gearset 110 while the ring gear 15 is connected through the clutch 70 to the carrier 178 of the rear planetary gearset 110. The planetary carrier 178 of the rear planetary gearset is connected to the output driven shaft 7 provide high output torque from the transmission. The reaction torque is transmitted from the front planetary carrier 14 to the ring gear 78 of the second planetary gearset 110 when the transmission is in operation. A high torque in the forward direction is transmitted to the output shaft 7.

When the transmission is placed in the third forward speed, the clutch 50 is engaged thereby clutching the front clutch carrier 10 to the ring gear 15 of the front planetary gearset 80. The clutches 70 and 100 of the first and second rear clutch carriers 60 and 90 are also engaged. The input driving torque on the input shaft 4 is transmitted through the sun gear 13 to the planet gears 74 driving the carrier 14 of the front planetary gearset 80 which is transmitted to the ring gear 78 of the second planetary gearset 110. The driving torque is transmitted to the planet gears 83 driving the planetary carrier 178 to the output shaft 7. The reaction torque is transmitted from the ring gear 15 to the front clutch carrier 10 through the countershaft gearset through clutch 100 to the sun gear 18. The net result is a positive torque driving the output shaft 7 in a forward direction.

When the transmission is placed in the fourth forward speed, the clutch 40 is engaged thereby clutching the carrier 14 of the front planetary gearset 80 to the front clutch carrier 10. The clutches 70 and 100 of the first and second clutch carriers 60 and 90 are also engaged.

The input driving torque is transmitted through the input shaft 4 to the sun gear 13. The torque is transmitted through the planet gears 74 to the ring gear 15 of the front planetary gearset 80. Torque is transmitted through the clutch 70 to the carrier 178 of the rear planetary gearset 110. The output torque is transmitted through the carrier 178 to the output shaft 7. The reaction torque is transmitted through the carrier 14 to the front clutch carrier 10 through the countershaft gearset 120 and the clutch 100 to the sun gear 18 of the rear planetary gearset 110. Simultaneously, reaction torque is also transmitted from carrier 14 to the ring gear 78 to the rear planetary gearset 110 with a net result of a positive forward speed for the transmission.

When the vehicle transmission is shifted into fifth gear, the clutch 30 of the front clutch carrier 10 clutches the sun gear 13 and the input drive shaft 4 to the front clutch carrier 10. Clutches 70 and 100 of the first and second rear clutch carrier 60 and 90 are also engaged. The input drive torque on input shaft 4 drives through clutch 30 through the countershaft gearset 120 and clutch 100 driving the sun gear 18 of the rear planetary gearset 110. The planetary carrier 14 of the front planetary gearset 80 drives the ring gear 78 of the rear planetary gearset 110. Simultaneously, the driving torque is transmitted through the ring gear 15 of the front planetary gearset 80 through clutch 70 to the carrier 178 of the rear planetary gearset 110. The net result is a forward driving torque on the output shaft 7.

When the transmission is positioned in the sixth speed forward, the clutch 30 on the front clutch carrier 10 is engaged. The clutch 50 on the front clutch carrier 10 is also engaged, as well as the clutch 100 on the second of the rear planetary carriers 90. The driving torque is transmitted through clutch 30 to the countershaft gearset 120 driving the sun gear 18 of the rear planetary gearset 110 through clutch 100 on the second rear clutch carrier 90. The front planetary gearset is locked since clutch 30 clutches the sun gear 13 while clutch 50 clutches the ring gear 15 to the front clutch carrier 10. Power is transmitted to the ring gear 78 of the rear planetary gearset 110. The net result is a positive forward drive of the transmission.

When the transmission is placed in the seventh gear, the clutches 30, 50 and 70 are engaged. The clutches 30 and 50 lock the front planetary gearset 80 providing a direct drive through the front planetary gearset 80. Clutch 70 on the first of the rear clutch carriers 60 is engaged to lock the rear planetary gearset 110 and drive the output shaft 7 to provide a high speed forward drive of the transmission.

The embodiments of the invention in which an exclusive property or privilege is claimed are defined as follows:

1. A transmission including an input and an output shaft rotatably mounted in a transmission housing, a front planetary gearset having a sun gear connected to said input shaft, a rear planetary gearset having a planetary carrier connected to said output shaft, means connecting the planetary carrier of the front planetary gearset to the ring gear of the rear planetary gearset, a front clutch carrier mounted coaxially with said front planetary gearset carrying a plurality of clutches and a drive gear, a first rear clutch carrier mounted coaxially on the planetary carrier of said rear planetary gearset carrying a clutch, a second rear clutch carrier mounted coaxially with said rear planetary gearset carrying a clutch and a driven gear, a countershaft gearset mounted in said transmission housing engaging said drive gear on said front clutch carrier and said driven gear on the second of said rear clutch carriers to provide countershaft gearing, one friction member included in each clutch of said front clutch carrier and said first and second of said rear clutch carriers, means connecting one of said friction members to one single element including a ring gear, a sun gear, a planetary carrier of the front planetary gearset and the sun gear of said rear planetary gearset for selectively clutching said elements of said planetary gearsets to the respective clutch carrier, a brake on said transmission housing for braking said front clutch carrier to said transmission housing, control means for selectively actuating said brake and clutches for transmission of power through said transmission at selected speed ratios.

2. A transmission as set forth in claim 1 wherein said transmission includes said brake mounted on the transmission housing including a friction member connected to the front clutch carrier, a clutch on the front clutch carrier including a friction member connected to the planetary carrier of the front planetary gearset, a clutch mounted on the first of said rear clutch carriers including a friction member connected to the ring gear of the front planetary gearset to thereby provide transmission of power to the planetary carrier of the second planetary gearset to provide a reverse direction of the output shaft of said transmission.

3. A transmission as set forth in claim 1 wherein said brake on the transmission housing includes a friction member on the front clutch carrier, a clutch on the front clutch carrier includes a friction member connected to the ring gear of the front planetary gearset, and a clutch on the second of the rear clutch carriers includes a friction member connected to the sun gear of the rear planetary gearset to thereby provide transmission of power through the planetary carrier of the front planetary gearset to the ring gear and the planetary carrier of the rear planetary gearset to provide a forward direction of rotation to the output shaft of the transmission.

4. A transmission as set forth in claim 1 wherein said brake on said transmission housing includes a friction member connected to front clutch carrier, a clutch mounted on the first of said rear clutch carriers includes a friction member connected to the ring gear of said first planetary gearset, a clutch mounted on the second of said rear clutch carriers includes a friction member connected to the sun gear of said second planetary gearset to provide transmission of power through said planetary gearsets and a forward speed of rotation for said transmission.

5. A transmission as set forth in claim 1 wherein said transmission includes a clutch on the front clutch carrier including a friction member connected to the ring gear of the front planetary gearset, a clutch on the first of said rear clutch carriers including a friction member connected to a ring gear of said front planetary gearset, a clutch on the second of said rear clutch carriers including friction member connected to the sun gear of said rear planetary gearset to thereby provide power transmission through said planetary gearsets and said countershaft gearset to provide forward rotation of said output shaft of said transmission.

6. A transmission as set forth in claim 1 wherein said transmission includes a clutch on said front clutch carrier including a friction member connected to the planetary carrier of said front planetary gearset, a clutch on the first of said rear clutch carriers including a friction member connected to the ring gear of said front planetary gearset, a clutch mounted on the second of said rear planetary gearsets including a friction member connected to the sun gear of said rear planetary gearsets to thereby provide power transmission through said countershaft gearset and said planetary gearsets to provide forward speed drive of said transmission.

7. A transmission as set forth in claim 1 wherein said transmission includes a clutch on the front clutch carrier including a friction member connected to the sun gear of said front planetary gearset, a clutch on the first of said rear clutch carriers including a friction member connected to the ring gear of said front planetary gearset, a clutch mounted on the second of said rear clutch carriers including a friction member connected to the sun gear of said rear planetary gearset to thereby provide power transmission through said countershaft gearset and said planetary gearsets to thereby provide a forward speed for said transmission.

8. A transmission as set forth in claim 1 wherein said transmission includes a clutch mounted on the front clutch carrier including a friction member connected to the sun gear of the front planetary gearset, a second clutch on said front clutch carrier including a friction member connected to the ring gear of said front planetary gearset, a clutch mounted on the second of said rear clutch carriers including a friction member connected to the sun gear of said rear planetary gearsets whereby said transmission locks the front planetary gearset and drives through the secondary planetary gearset and the countershaft gearset to provide a forward speed of rotation of the transmission.

9. A transmission as set forth in claim 1 wherein said transmission includes a clutch mounted on the front clutch carrier including a friction member connected to the sun gear of the front planetary gearset and a clutch including a friction member connected to the ring gear of the front planetary gearset, a clutch mounted on the first of the rear clutch carriers including a friction member connected to the ring gear of the front planetary gearset to thereby lock the front and rear planetary gearsets to provide direct drive through the front and the rear planetary gearsets and provide forward speed of said transmission.

10. A transmission as set forth in claim 1 wherein said input drive shaft extends coaxially through said transmission housing and includes power take-off means on said shaft, said output driven shaft comprises a quill shaft for transmitting power output from said transmission.

* * * * *